(12) United States Patent
Rabra et al.

(10) Patent No.: US 10,432,785 B2
(45) Date of Patent: Oct. 1, 2019

(54) OPTIMIZED SYSTEM AND METHOD FOR NOTIFYING A CALLED PARTY OF A CALL ATTEMPT

(71) Applicant: Comviva Technologies Ltd., Haryana (IN)

(72) Inventors: Arun Rabra, Haryana (IN); Manish Kumar Jain, Delhi (IN)

(73) Assignee: COMVIVA TECHNOLOGIES LTD. (IN)

( * ) Notice: Subject to any disclaimer, the term of this patent is extended or adjusted under 35 U.S.C. 154(b) by 1 day.

(21) Appl. No.: 15/545,439

(22) PCT Filed: Dec. 23, 2015

(86) PCT No.: PCT/IB2015/059916
§ 371 (c)(1),
(2) Date: Jul. 21, 2017

(87) PCT Pub. No.: WO2016/103203
PCT Pub. Date: Jun. 30, 2016

(65) Prior Publication Data
US 2018/0007198 A1    Jan. 4, 2018

(30) Foreign Application Priority Data
Dec. 23, 2014 (IN) .......................... 3897/DEL/2014

(51) Int. Cl.
*H04M 3/42* (2006.01)
*H04M 15/00* (2006.01)
*H04Q 3/00* (2006.01)

(52) U.S. Cl.
CPC ... *H04M 3/42195* (2013.01); *H04M 3/42042* (2013.01); *H04M 3/42059* (2013.01);
(Continued)

(58) Field of Classification Search
CPC .... H04M 15/00; H04M 17/00; H04M 15/888; H04M 15/854; H04M 15/08;
(Continued)

(56) References Cited

U.S. PATENT DOCUMENTS 5,740,229 A * 4/1998 Hanson ................... H04M 3/48
379/114.05
5,859,900 A * 1/1999 Bauer ................... H04M 15/00
379/114.15
(Continued)

FOREIGN PATENT DOCUMENTS

WO    WO-2016141629 A1 *  9/2016  .......... H04M 3/4202

OTHER PUBLICATIONS

Corresponding International Search Report and Written Opinion for PCT/IB2015/059916 dated Mar. 30, 2016. WO.

*Primary Examiner* — Matthew C Sams
(74) *Attorney, Agent, or Firm* — The Belles Group, P.C.

(57) ABSTRACT

A system and method for notifying a called party of a call attempt is provided. The method comprises initiating a communication request by a calling party; routing the communication request to an intelligent network via an mobile service center; validating the communication request by the intelligent network; and handing over the communication request to an intelligent platform by the intelligent network in the event of a nonstandard trigger event such as calling party insufficient balance. The processing of communication request by the intelligent platform includes monitoring number of call attempts, introducing a delay in sending notification, monitoring availability of called party and performing one or more actions based on the delay and the availability of the called party.

11 Claims, 6 Drawing Sheets

(52) U.S. Cl.
CPC ... *H04M 3/42374* (2013.01); *H04M 15/8038* (2013.01); *H04M 15/83* (2013.01); *H04M 15/8351* (2013.01); *H04M 15/84* (2013.01); *H04M 15/844* (2013.01); *H04M 15/852* (2013.01); *H04M 15/854* (2013.01); *H04M 15/856* (2013.01); *H04M 15/90* (2013.01); *H04Q 3/0029* (2013.01); *H04M 2203/1008* (2013.01); *H04M 2203/651* (2013.01); *H04M 2242/04* (2013.01); *H04Q 2213/13345* (2013.01); *H04Q 2213/13545* (2013.01); *H04Q 2213/345* (2013.01)

(58) Field of Classification Search
CPC .. H04M 17/20; H04M 2215/62; H04M 15/85; H04M 15/852; H04M 2215/815; H04M 15/8351; H04M 15/84; H04M 15/844; H04M 2215/8129; H04M 2215/8137; H04M 2215/8158; H04M 3/42042; H04M 15/851; H04M 15/853; H04M 17/02; H04M 2215/8162; H04M 15/28; H04M 15/835; H04M 15/8353; H04M 15/842; H04M 15/86; H04M 17/206; H04M 2017/243; H04M 2215/8104; H04M 2215/8112; H04M 2215/8133; H04M 2215/8187; H04M 15/88; H04M 2215/2026; H04M 17/10; H04M 2203/1008; H04M 2215/0116; H04M 2215/32; H04M 15/06; H04M 15/47; H04M 15/58; H04M 2203/651; H04M 2215/0148; H04M 2215/0188; H04M 3/42195; H04M 15/83; H04M 15/881; H04M 15/882; H04M 1/575; H04M 1/72519; H04M 2201/14; H04M 2201/38; H04M 2215/8166; H04M 2215/82; H04M 3/02; H04M 3/42; H04M 3/424; H04M 15/772; H04M 2215/0168; H04M 2215/81; H04M 2215/8108; H04M 3/42059; H04M 3/48; H04M 3/533; H04W 4/24; H04W 4/12; H04W 4/14; H04W 48/02; H04L 12/14

See application file for complete search history.

(56) References Cited

U.S. PATENT DOCUMENTS

| | | | | |
|---|---|---|---|---|
| 6,728,349 | B2* | 4/2004 | Chang | H04M 1/575 379/142.01 |
| 7,613,449 | B2* | 11/2009 | Romppanen | H04L 12/14 455/412.1 |
| 7,643,816 | B2* | 1/2010 | Romppanen | H04L 12/14 455/405 |
| 8,675,841 | B2* | 3/2014 | Kahn | H04M 3/42042 379/114.15 |
| 8,688,075 | B2* | 4/2014 | Hwang | H04M 15/00 455/408 |
| 8,913,988 | B1* | 12/2014 | Hwang | H04M 15/00 455/408 |
| 9,094,890 | B2* | 7/2015 | Kahn | H04M 3/42042 |
| 9,191,524 | B1* | 11/2015 | Hwang | H04M 15/00 |
| 9,432,524 | B1* | 8/2016 | Hwang | H04M 15/00 |
| 9,614,980 | B1* | 4/2017 | Hwang | H04M 15/00 |
| 9,674,375 | B2* | 6/2017 | Ting | H04W 4/21 |
| 2003/0198324 | A1* | 10/2003 | Chang | H04M 1/575 379/93.23 |
| 2004/0023636 | A1* | 2/2004 | Gurel | H04M 15/44 455/405 |
| 2004/0029561 | A1* | 2/2004 | Holter | H04M 15/00 455/405 |
| 2004/0192359 | A1* | 9/2004 | McRaild | H04M 15/00 455/466 |
| 2008/0075249 | A1* | 3/2008 | Zach | H04M 15/00 379/114.17 |
| 2009/0075627 | A1* | 3/2009 | Hwang | H04M 15/00 455/408 |
| 2013/0188786 | A1* | 7/2013 | Kahn | H04M 3/543 379/142.01 |
| 2014/0199960 | A1* | 7/2014 | Kahn | H04M 3/42042 455/405 |

* cited by examiner

OPTIMIZED SYSTEM AND METHOD FOR NOTIFYING A CALLED PARTY OF A CALL ATTEMPT

CROSS-REFERENCE TO RELATED APPLICATION

This application is a National Stage of International Application No. PCT/IB2015/059916, filed Dec. 23, 2015, which claims priority to Indian Patent Application No. 3897/DEL/2014, filed on Dec. 23, 2014. The disclosures of the above applications are incorporated herein by reference.

FIELD OF THE INVENTION

The present invention relates to the field of providing call back notifications in a mobile network, and more specifically to the field of notifying a call attempt in the event of service restrictions at calling party side.

BACKGROUND

Typically, cellular phones help establish phone call between a calling party and a called party. To establish a phone call with the called party, the calling party sends a connection request to a mobile switching center provided by a network service provider. The network service provider establishes the phone call between the calling party and the called party. However, certain trigger events disable the network service provider from establishing the phone call between the calling party and the called party. The trigger event can be a standard trigger event or a nonstandard trigger event. The standard trigger event is at least one of switched off, call forwarding unconditional, a short call for which connection cannot be established, insufficient credit in the calling parties account, and network unavailability for the called party. The nonstandard trigger event is one of a protocol error, internal error and calling party insufficient balance. Many solutions exist for standard trigger events. However, at times the calling party intends to inform the called party of an emergency situation. But the failure in establishing the phone call due to the nonstandard trigger event creates a communication gap. There exist systems to provide notifications to the called party in the event of occurrence of the failed call. However, existing systems lack an integrated intelligent module to detect the nonstandard trigger events and further send notifications to the called party. Moreover, existing systems lack facilities to receive delivery reports and acknowledgement messages from the called party.

In one existing prior art, a system is provided for enabling a calling party with insufficient balance to send a "call me back" notification to a called party. The system allows the calling party to send the "call me back" notification to the called party for free of charge. The calling party sends the "call me back" notification by appending a special character number to the called party's phone number and pressing dial. The "call me back" notification requests the called party to make a phone call to the calling party. However, the system lacks an integrated intelligent module to perform the functions of sending the notification for a failed call. Moreover, the systems lack facilities to receive delivery reports and acknowledgement messages from the called party.

In one existing prior art, the network service provider monitors attempts by the calling party to establish a phone call. If the network service provider detects the occurrence of a failed call, the network service provider sends the called party a message. Further, the network service provider provides the calling party's name and number to the called party. However, the system provided by the network service provider lacks an integrated intelligent platform to perform the functions of monitoring attempts made by the calling party along with sending the message, receiving delivery reports, and acknowledging messages from the called party to the calling party.

As a result, there is a need for an integrated intelligent module to send notifications to the called party. Further, there is a need for a system for allowing communication between the called party and the integrated intelligent platform. Further, there is a need for a system with facilities to send delivery reports and acknowledgment messages from the called party to the calling party.

SUMMARY

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

An example of a method for notifying a called party of a call attempt, the method includes initiating a communication request by a calling party; routing the communication request to an intelligent network via an mobile service centre; validating the communication request by the intelligent network; and handing over the communication request to an intelligent platform by the intelligent network in the event of a nonstandard trigger event. The method further includes processing the communication request by the intelligent platform. The processing of communication request includes monitoring number of call attempts performed by the calling party. The intelligent platform introduces a delay in sending a notification to the called party based on the number of call attempts. The processing of communication request includes monitoring availability of the called party. Thus, the intelligent platform notifies the called party about the call attempt. The intelligent platform performs one or more actions based on response of the called party.

An example of a system for notifying a called party of a call attempt includes a Mobile Switching Centre (MSC) configured for receiving a communication request from a calling party and sending a nonstandard trigger event to an Intelligent Network. The system includes the intelligent network to validate if the communication request can be serviced. Further, the intelligent platform monitors number of call attempts performed by the calling party. The intelligent platform introduces a delay in sending a notification to the called party based on the number of call attempts. The intelligent platform monitors availability of the called party and notifies the called party about the call attempt. Further, the intelligent platform performs one or more actions based on response of the called party.

In an embodiment, a method of notifying a called party of a call attempt by a calling party is provided. The method comprising:

receiving a communication request on occurrence of a nonstandard trigger event;

processing the communication request, wherein the processing comprises steps of:
monitoring number of call attempts performed by the calling party;
introducing a delay in sending a notification to the called party based on the number of call attempts;
monitoring availability of the called party; and
notifying the called party about the call attempt based on said delay and availability of the called party.

In another embodiment, the nonstandard trigger event is one of protocol error, internal error and calling party insufficient balance.

In another embodiment, monitoring the availability of the called party comprises one of: sending a silent message to the called party, wherein the successful delivery of the silent message prompts the called party to send an acknowledgement indicating the called party availability; and analyzing the connectivity between the called party and Mobile Switching Center (MSC) of the called party.

In another embodiment, introducing the delay comprises at least one of: defining a threshold duration; and defining a threshold count for the number of call attempts by the calling party.

In another embodiment, notifying comprises one of sending notification to the called party after completion of a threshold duration; and sending notification to the called party if communication requests exceeds a threshold count.

In another embodiment, notifying the called party about the call attempt comprises: sending a message with subscriber information to the called party, wherein the message includes at least one of SMS, MMS, or voicemail message; and providing a list of options to perform one or more actions, wherein the list of options is displayed as one of a pop up and a dialog box.

In another embodiment, the message comprises a call back request and the calling party's telephone number and name, a request that the call recipient contact the caller, and number of call attempts by the calling party.

In another embodiment, the options comprises at least one of:
reminding the called party of the notification at a later time;
informing the calling party when the called party wishes to respond;
providing status of the called party; and
disabling further notification from the calling party.

In another embodiment, the method of notifying the called party further comprises performing one or more actions based on a response of the called party to said list of options.

In another embodiment, the method of notifying further comprising allowing the called party to receive notifications from a set of predefined numbers in case of an emergency.

In another embodiment, the system for notifying a called party of a call attempt by a calling party is provided. The system comprises a call processing module (360) for receiving and processing a communication request on occurrence of a nonstandard trigger event; a monitoring module for monitoring number of call attempts performed by the calling party and for monitoring availability of the called party; a timer module, in operational interconnection with a counter module, for introducing a delay in sending a notification to the called party based on the number of call attempts; and a notification module for notifying the called party about the call attempt based on said delay and availability of the called party.

In another embodiment, said monitoring module is configured to determine number of call attempts performed by the calling party and availability of the called party in the network; said timer module is configured to calculate time until a threshold time duration, wherein the threshold time duration is a delay time prior to nonstandard trigger notification; said counter module is configured to count until a threshold count, wherein the threshold count is number of call attempts made prior to nonstandard trigger notification; and said notification module is configured to generate one or more notification messages about a call attempt on detection of the nonstandard trigger event.

In another embodiment, the method of notifying said one or more notification messages by the notification module comprises:
message with subscriber information to the called party, wherein the message includes at least one of SMS, MMS, voicemail message; and
options to perform one or more actions, wherein the options are displayed as one of a pop up and a dialog box to the called party.

In another embodiment, the nonstandard trigger event is one of protocol error, internal error and calling party insufficient balance.

In another embodiment, the system is configured to perform one or more actions based on a response of the called party to said notification messages.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF FIGURES

In the following drawings like reference numbers are used to refer to like elements. Although the following figures depict various examples of the invention, the invention is not limited to the examples depicted in the figures.

DETAILED DESCRIPTION OF THE INVENTION

In the present disclosure, relational terms such as first and second, and the like, may be used to distinguish one entity from the other, without necessarily implying any actual relationship or order between such entities. The following detailed description is intended to provide example implementations to one of ordinary skill in the art, and is not intended to limit the invention to the explicit disclosure, as one or ordinary skill in the art will understand that variations can be substituted that are within the scope of the invention as described.

Embodiments of the present disclosure described herein disclose a method and system for notifying the called party of a call attempt in the event of one of protocol error, internal error and calling party insufficient balance. The present inventions provides an intelligent platform for processing communication requests and performs operations based on the user's response to the notification.

Figure 1:
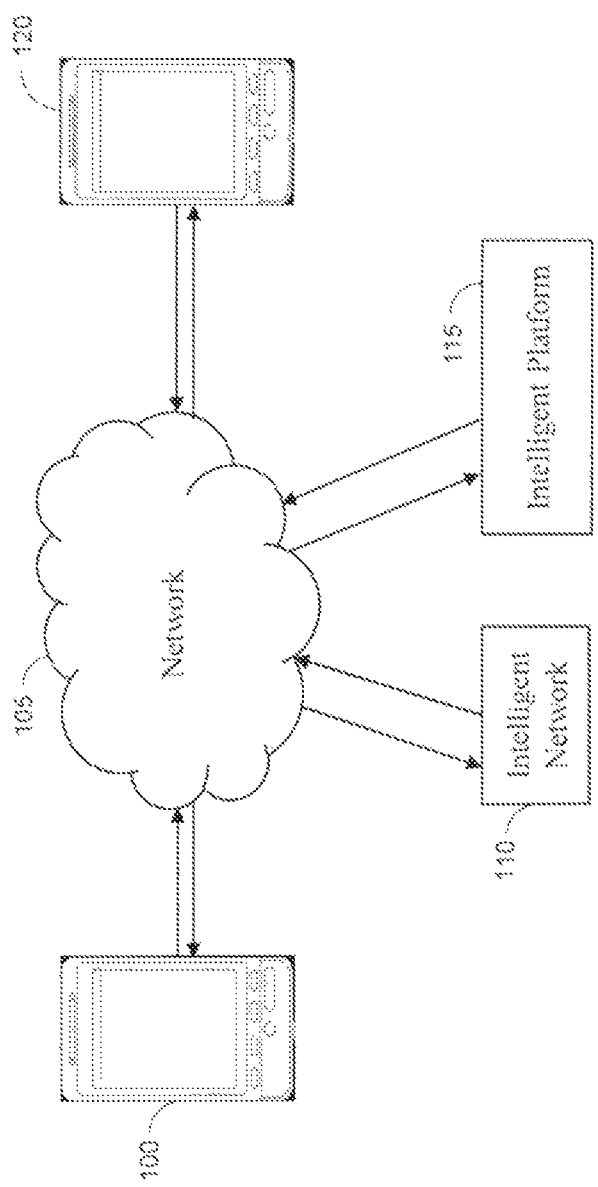
FIG. 1 illustrates a block diagram of an environment, in accordance with which various embodiments of the invention can be implemented.

FIG. 1 illustrates the block diagram of an environment in accordance with one embodiment of the present invention. The caller at mobile terminal 100 initiates a communication request over a mobile network 105 to a mobile terminal 120. The communication request corresponds to any of a voice call request, a video call request, a SMS request, a MMS request, or a Rich Communications Suite (RCS) request. The mobile terminals 100 and 120 can be a mobile phone, a personal digital assistant (PDA), a multimedia computer, a personal computer, a lap top, and any terminal capable of accessing voice communication services. The mobile network 105 can be any cellular, broadcast, and wide area network. Examples of mobile network 105 technologies include but are not limited to GSM (Global System for Mobile communication), WCDMA (Wideband CDMA), CDMA (Code Division Multiple Access), GPRS (General Packet Radio Service), UTRAN (UMTS Radio Access Network), UMTS (Universal Mobile Telecommunications System), and MBMS (Multicast Broadcast Multimedia System).

The exemplary GSM communications network 105 of FIG. 1 comprises a mobile switching center (MSC). The MSC is capable of handling service provision for both contract subscribers and prepaid subscribers of the network 105 in the area it serves. Subscribers may originate or receive multimedia, video, voice, data or fax calls or sessions, short messages using the Short Message Service (SMS), and email messages, enhanced or multimedia messages (MMS). The MSC routes the call to an intelligent network 110.

In one embodiment of the invention, the intelligent network 110 validates the communication request for a nonstandard trigger event. The nonstandard trigger event is one of protocol error, internal error and calling party insufficient balance. The nonstandard trigger events are defined by the network 105. In case of validation of the nonstandard trigger event, the intelligent network 110 forwards the communication request to an intelligent platform 115. The intelligent network 110 communicates with the intelligent platform 115 using one of Short Message Peer to Peer (SMPP) communication protocol, signaling system number 7, Signaling Transport (SIGTRAN), Session Initiation Protocol (SIP), Universal Computer protocol and Hypertext Transfer Protocol (HTTP). In case of the nonstandard trigger event validation by the intelligent network 110 is unsuccessful, the intelligent network 110 directly connects the communication request to the mobile terminal 120. The role of intelligent network 110 is further illustrated in FIG. 3.

In another embodiment of the present invention, the Intelligent Network 110 is configured for generating a call detail record (CDR). The CDR includes data indicative of called party and a calling party. The CDR further includes a timestamp. The CDR is forwarded to the intelligent platform 115 in at least one of a Rich Site Summary (RSS) format, an Extensible Markup language (XML) format, a Hyper Text Markup Language (HTML) format, a text format, a portable document format (PDF), a word format and excel format. In case the intelligent network 110 fails to service the communication request between the mobile terminal 105 and mobile terminal 110, the intelligent network 110 forwards the CDR to the intelligent platform 115.

The intelligent network 110 forwards the event of failed communication request to the intelligent platform 115. The intelligent platform 115 is configured to send call back requests, and call attempt notifications. The intelligent platform 115 is an integrated platform that can be introduced into existing mobile communication network 105 to enable users to subscribe to the call me back services. The working of the intelligent platform 115 is further illustrated in FIG. 3.

Figure 2:
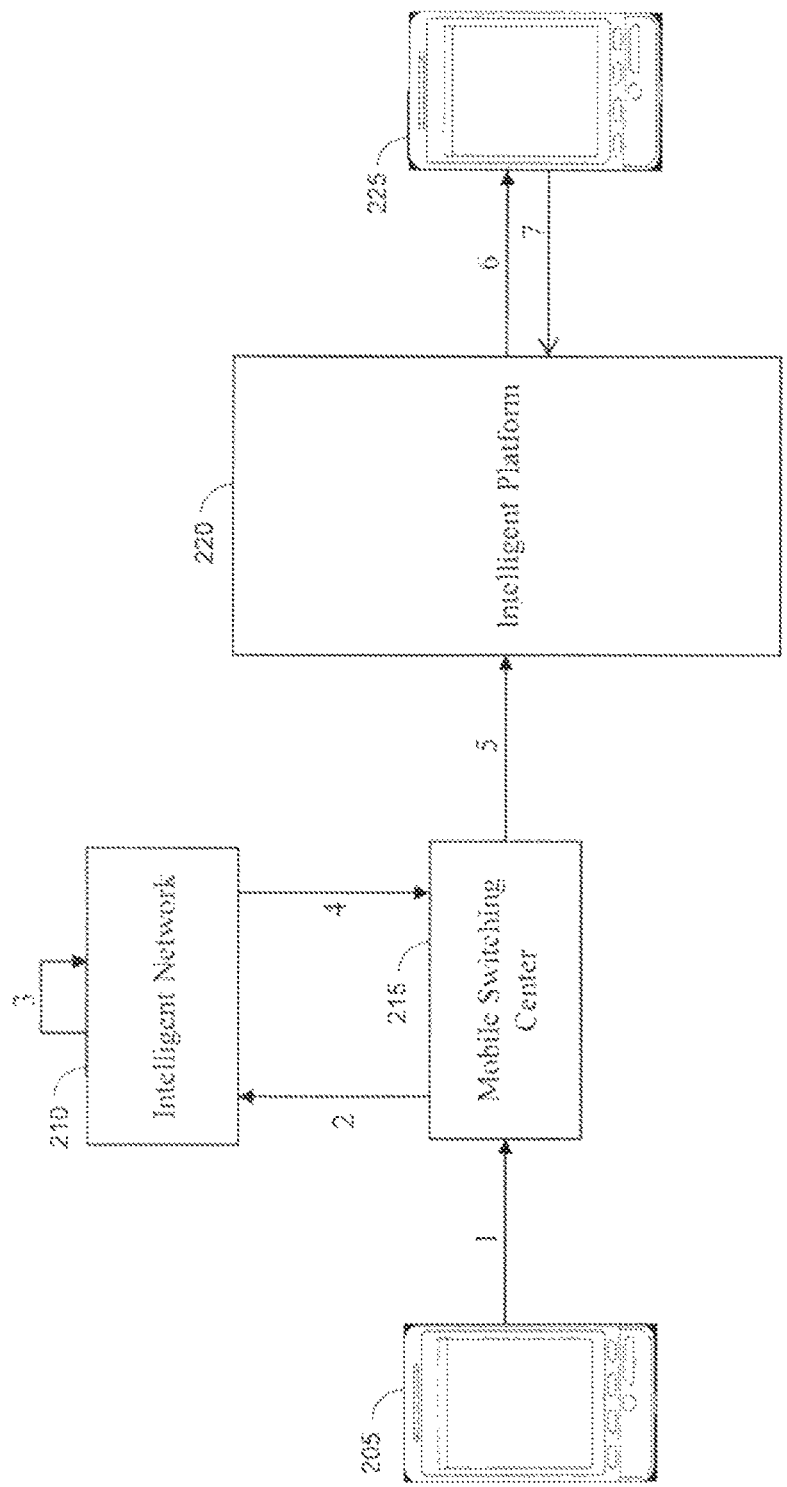
FIG. 2 illustrates the flow diagram of a system for notifying a called party of a call attempt, in accordance with one embodiment of the present invention.

FIG. 2 illustrates the flow diagram of a system for notifying a called party of a call attempt, in accordance with one embodiment of the present invention. The system includes an integrated intelligent module called Intelligent Platform 220 for notifying a subscriber of a call attempt in the event of a nonstandard trigger event. The nonstandard trigger event is one of protocol error, internal error and calling party insufficient balance.

The steps for notifying a called party of a call attempt is processed as follows:

A first user of mobile terminal 205 initiates a communication request to connect to a mobile terminal 225. The request message normally provides information concerning the service and the identity of the first user. The MSC 215 is configured for receiving the communication request from the mobile terminal 205 as depicted in step {1.}

The MSC 215 sends the nonstandard trigger event to the Intelligent Network 210 to validate whether the communication request can be serviced as depicted in step {2}.

The intelligent network 210 retrieves the details of the first user, and parses a database to check the information of the first user including the account balance, user credentials, service type, and service restrictions as depicted in step {3}.

The Intelligent network 210 sends response to the MSC 215 as depicted in step {4}. The response includes one of an approval message to connect the communication request to the mobile terminal 225 and a disconnect message to the MSC 215. The disconnect message is sent in case of the nonstandard trigger event.

The intelligent network 210 hands over the communication request to an intelligent platform 225 via the MSC as depicted in step {5} in the event of the nonstandard trigger event. In one embodiment of the invention, the intelligent network 210 hands over the communication request to the intelligent platform using one of Short Message Peer to Peer (SMPP) communication protocol, signaling system number 7, Signaling Transport (SIGTRAN), Session Initiation Protocol (SIP), Universal Computer protocol and Hypertext Transfer Protocol (HTTP).

The intelligent platform 225 processes the communication request to send notification to the mobile terminal 225 about the call attempt as depicted in step {6}. In one scenario, the notification is send to the called party after completion of a threshold duration. In another scenario, the notification is send if the number of call attempts by the first user exceeds a threshold count. In another embodiment, the notification is one of a SMS, MMS, USSD, voicemail message, application notification, and a combination thereof with subscriber information. In another embodiment, the notification includes a pop-up message or a dialog box on the mobile terminal 225 displaying options to perform one or more actions.

A user of the mobile terminal 225 is enabled to perform actions including one of reminding of the notification at a later time, informing the calling party when the called party wishes to respond; providing the users status of the called party, and disabling further notification from the calling party. The mobile terminal 225 sends response as depicted in step {7} to the intelligent network 220 after performing one of the above mentioned actions.

The processing of communication request by the intelligent platform 225 includes the following steps:
monitoring the availability of the user at mobile terminal 225.
monitoring number of call attempts performed by the first user at mobile terminal 205.
introducing a delay in sending a notification to the user at a mobile terminal 225.

In one embodiment, the intelligent platform 220 monitors the availability of the user at mobile terminal 225 by one of sending a silent message to the called party at mobile terminal 225 and monitoring the connectivity of the mobile terminal 225 to a Mobile Switching Center (MSC). On receipt of the silent message the mobile terminal 225 sends an acknowledge receipt of the silent message to the intelligent platform 220. On receiving the acknowledgment receipt of the silent message from the mobile terminal 225, the intelligent platform 220 confirms the availability of the called party at the mobile terminal 225. The silent message is at least one of a type zero message.

In another embodiment, the intelligent platform 220 introduces a delay before sending the notification to the mobile terminal 225. The delay includes one of a threshold duration introduced by a timer, and a threshold count for the number of call attempts introduced by a counter. Further, the notification sent to the mobile terminal 225 is a user selected type of notification. The types of notification available for user selection include SMS, MMS, USSD, voicemail message, Handset App based notification or a combination thereof.

In yet another embodiment, the intelligent platform 220 displays a plurality of options on the mobile terminal 225 and performing one or more actions based on response of the called party. The intelligent platform 220 performs one or more actions based on a response of the called party to the notification messages. The one or more actions include sending a delivery report to the first user, notifying the first user about the status of called party at mobile terminal 225, and blocking further notifications from the first user. Furthermore, the intelligent platform 220 allows a user/called party to define a set of numbers to receive notifications in case of an emergency. For example, a user can submit the number of family member from which notification regarding call attempt should be received.

Figure 3:
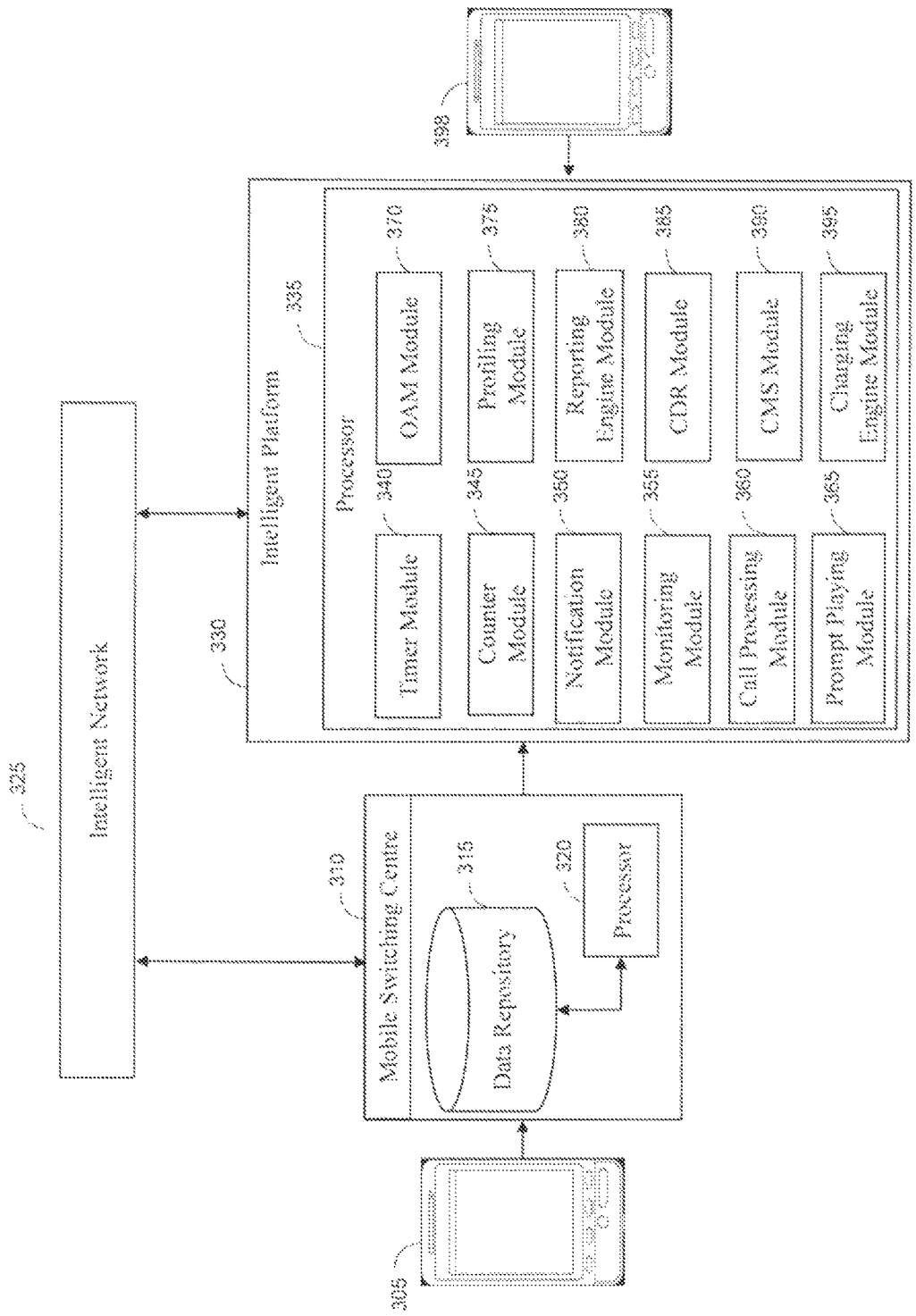
FIG. 3 illustrates the block diagram of the system for notifying the called party of a call attempt, in accordance with one embodiment of the present invention.

FIG. 3 illustrates the block diagram of the system for notifying a called party of a call attempt, in accordance with one embodiment of the present invention. The system includes a mobile terminal 305, a mobile switching center (MSC) 310, an intelligent platform 325 and an intelligent platform 330.

The mobile terminal 305 initiates a communication request to the mobile terminal 360. The communication requested is routed to the MSC 310. The MSC 310 is provided with a data repository 315. The data repository 315 is a database temporarily storing subscriber authentication data for mobile stations active in its area. The processor 320 within the MSC 310 generates a nonstandard trigger event to the intelligent network 320. The Intelligent Network (IN) is the standard network architecture allowing operators to differentiate themselves by providing value-added services in addition to the standard telecom services such as PSTN, ISDN and GSM services on mobile phones. The intelligence is provided by network nodes on the service layer, distinct from the switching layer of the core network. One of Intelligent Network Application Protocol (INAP) and Customized Applications for Mobile networks Enhanced Logic (CAMEL) Application Part (CAP) is used in a network to query data repository 315 for a variety of functions including call initiation and call disconnection. The intelligent network 325 parses the data repository 315 to identify subscriber credentials, identify discounts applicable to network services provisioned to prepaid customers, call rates, credit balance in subscriber account. On the basis of analysis, the intelligent network 325 decides to route the call to one of the MSC 310 and the intelligent platform 330.

The intelligent platform 330 is an integrated platform introduced in the communication network for operation, Administration and management (OAM) of the mobile network. The intelligent platform 330 monitors the system level resources such as CPU, memory and disk usage and raises an alarm whenever configured threshold gets exceeded. The intelligent platform 330 monitors different applications registered with it to ensure maximum availability of the monitored application. The intelligent platform 330 monitors SS7 links to determine failed calls and call attempts. Further, the intelligent platform 330 generates notification in the event of a failed call or call attempt. The intelligent platform 330 is in operation with a processor 335 to perform steps of:
monitoring number of call attempts performed by the calling party at mobile terminal 305.
introducing a delay in sending a notification to the user at a mobile terminal 360.
monitoring the availability of the user at mobile terminal 360.

The processor 335 further comprises a monitoring module 355 to determine number of call attempts performed by the calling party. Further, the monitoring module 35 determines the availability of the called party in the network by sending a silent message and checking the delivery report of the silent message. The processor 335 further comprises a timer module 340 to define a threshold time duration. The threshold time duration is a delay time prior to nonstandard trigger event notification. The processor 335 further comprises a counter module 345 to define a threshold count. The threshold count is the number of call attempts after which the notification of a call attempt is send to the called party. The processor 335 further comprises a notification module 350 to generate notification messages about a call attempt in the event of a nonstandard trigger event. The processor 335 further comprises an OAM module 370 to support monitoring of external interfaces through alerts from other application that provides the status of the interface (SMPP interface, DB interface). The OAM module 370 receives the alert from external interfaces and transfer to any configured use media like mobile terminal.

The processor 335 further comprises a call processing module 360. The call processing module 360 enables the intelligent platform 330 to perform at least one of receive nonstandard triggering events and send nonstandard triggering events. The processor 335 further comprises a prompt playing module to display the notification generated by the notification module 350 to the user at mobile terminal 398. The processor 335 further comprises a profiling module 375 to parse the data repository 315. By parsing the data repository 315, the profiling module 375 categorizes user on the basis of availability of the service. The profiling module 375 enables the notification module 350 to send call back notifications to a called party at mobile terminal 398 with intelligent platform initialized.

Further, the processor 335 comprises a reporting engine module 380 to generate an online report of the status of the intelligent platform 330. Furthermore, the processor comprises a Content Management System 390 to provide the user at mobile terminal 398 an advertisement along with the notification. In one embodiment of the invention, the processor includes a charging engine module 395. The charging engine module 395 offers the user at mobile terminal 305 a credit and debit facility into the user account. In case the user at mobile terminal 305 initiate one of a sponsored call, the charging engine module 395 credits the user account. In case the user at mobile terminal 398 adds service amount to the user account by means of one of recharge and paying the bill, the charging engine module 395 debits the respective service amount to the user account.

Moreover, the processor comprises a Call Detail Record (CDR) module 360. The CDR module 360 generates ASCII based Call Detail Records (CDRs) for call back requests with detailed parameters along with the timestamp. An exemplary illustration of a CDR created in intelligent platform 330 is mentioned below in Table 1:

TABLE 1

| Field | Description |
| --- | --- |
| Time Stamp | The date and time of failed call |
| OPC | Origin Point Code |
| CIC | Circuit Identification Code |
| FTN | Number to which the failed call has been forwarded |
| Calling Number | The calling number |
| Called Number | The called number |

The CDR includes data indicative of called party and a calling party. The CDR further includes a timestamp. The timestamp is a sequence of characters of encoded information identifying when a certain event occurred, usually giving date and time of day, accurate to a small fraction of a second. The CDR, configured in the intelligent platform 115, is in at least one of a Rich Site Summary (RSS) format, an Extensible Markup language (XML) format, a Hyper Text Markup Language (HTML) format, a text format, a portable document format (PDF), a word format and excel format.

Figure 4:
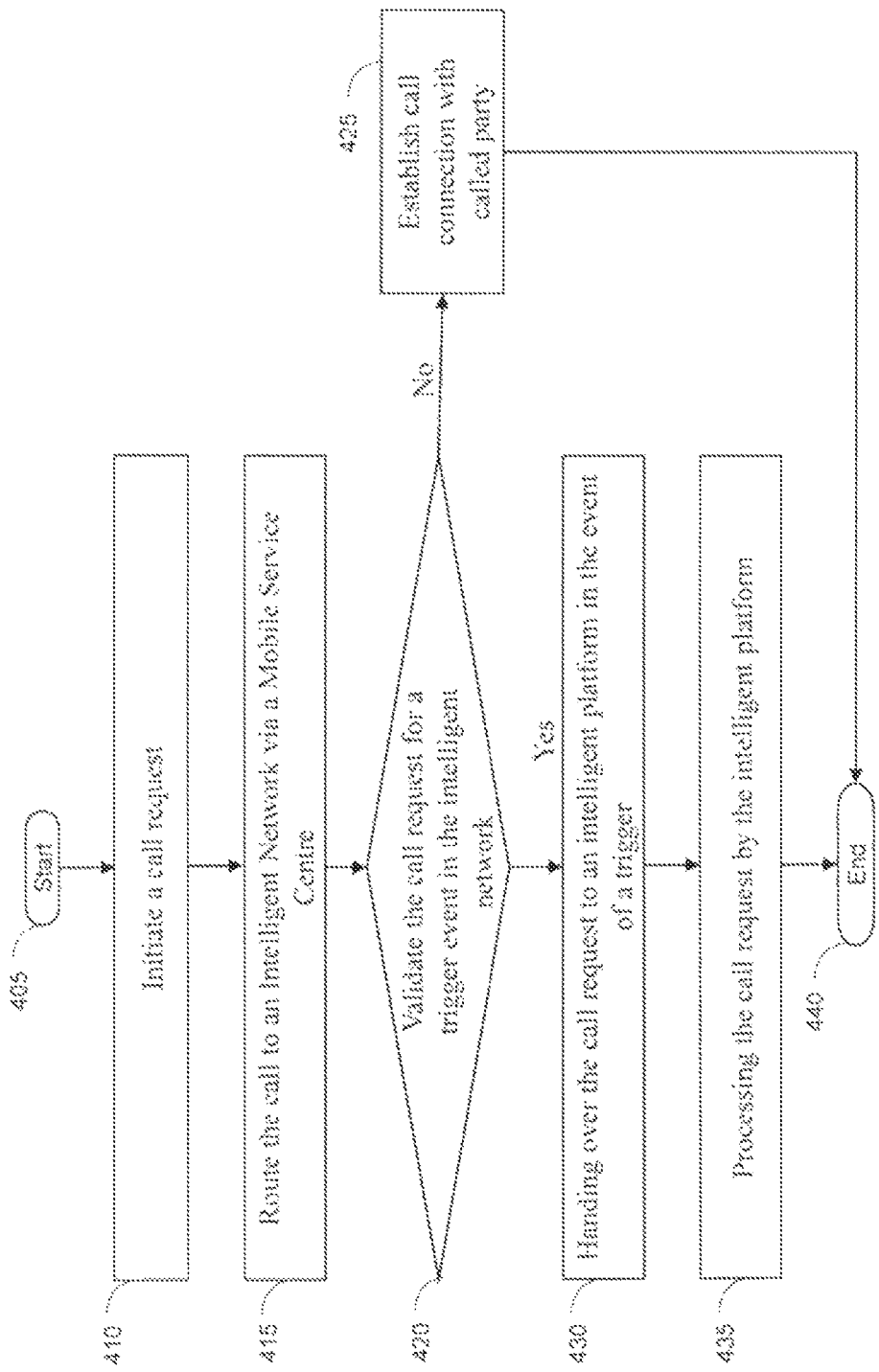
FIG. 4 is a flow chart illustrating the method for notifying the called party of a call attempt, in accordance with one embodiment of the present invention.

FIG. 4 is a flow chart illustrating the method for notifying a called party of a call attempt. The flow chart begins at step 405.

At step 410, a calling party initiates a communication request to the called party. The communication request is forwarded to a Mobile Switching Centre (MSC). The MSC is configured to receive the communication request from the calling party.

At step 415, the MSC routes the communication request to an Intelligent Network (IN).

At step 420, the IN validates the communication request for a nonstandard trigger event. The IN monitors a database for a nonstandard trigger event. The nonstandard trigger event is one of protocol error, internal error and calling party insufficient balance. If the IN validates the nonstandard trigger event step 425 is performed, else step 430 is performed.

At step 425, the IN establishes the call connection between the calling party and a called party.

At step 430, the IN hands over the communication request to an Intelligent Platform in the event of the nonstandard trigger event. The communication between the IN and the Intelligent Platform is established by at least one of Signaling System No. 7 (SS7) telephony signal protocol, Media Gateway control Protocol, Signaling Transport (SIGTRAN), Session Initiation Protocol (SIP), and Dual tone multi frequency signaling protocol.

At step 435, the Intelligent Platform processes the communication request initiated by the calling party to send a notification regarding call attempt to the called party. The Intelligent Platform monitors communication between the mobile service center and the intelligent network to determine disconnected communication requests. Further, the Intelligent Platform monitors number of call attempts performed by the calling party. The Intelligent Platform introduces a delay in the notification using one of a timer module and a counter module.

The flow chart ends at step 440.

Figure 5A:
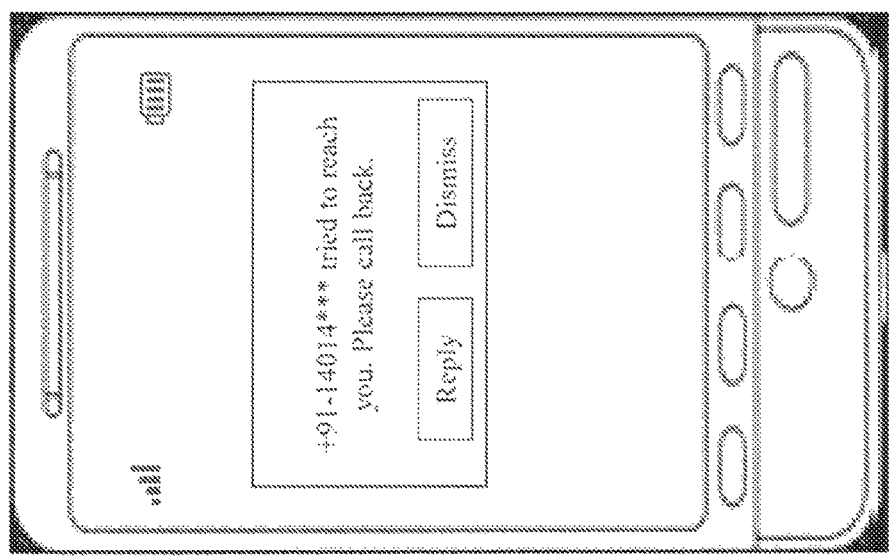
FIG. 5A is an exemplary illustration of a notification in a called party, in accordance with one embodiment of the present invention.

FIG. 5A is an exemplary illustration of a message sent to a called party by an intelligent platform, in accordance with one embodiment of the invention. An intelligent platform sends the message to the user device of a called party on detection of a nonstandard trigger event by an intelligent network. The message is at least one of but not limited to Simple Messaging Service (SMS), Multimedia Messaging Service (MMS), Rich Communication Suite (RCS) voice/non-voice message, and a combination thereof. The message is a call back request for informing to the called party of the calling party's telephone number, and number of call attempts by the calling party. Further, the message informs the called party about a call attempt by the caller party. Further, the called party can perform one of reply to the message and dismiss the message.

Figure 5B:
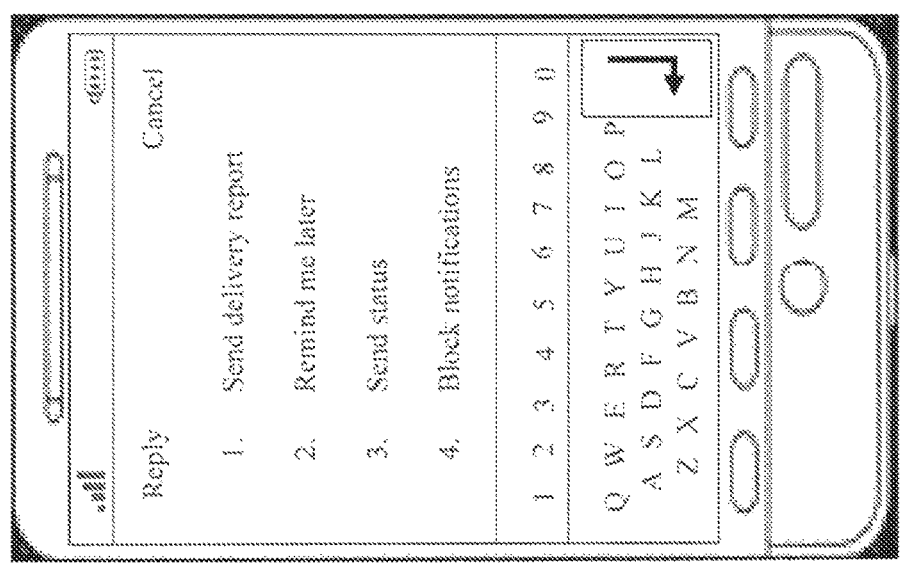
FIG. 5B is an exemplary illustration of displaying options to the called party, in accordance with one embodiment of the present invention.

FIG. 5B is an exemplary illustration of a list of options provided to the called party by the intelligent platform. On receiving the message from the intelligent platform, the called party can either reply to the message or dismiss the message. In one scenario, the called party selects the reply to message option. The intelligent platform provides a list of options to the called party. The list of options are displayed as one of a pop up and a dialog box. The list of options include at least one of reminding the called party of the message at a later time, providing the status of the called party, disabling further notification from the calling party, and informing the calling party when the called party wishes to respond.

Advantageously, the system and method disclosed herein allow a mobile phone service provider to easily monitor and control subscribers. The system provides value addition to subscribers and allow subscribers to control the way in which they would like to receive messages during emergency. Further, the system provides subscribers a greater degree of privacy than existing methods.

The invention claimed is:

1. A method of notifying a called party of a call attempt by a calling party, the method comprising:
   receiving a communication request on occurrence of a nonstandard trigger event, the nonstandard trigger event being one of protocol error, internal error and calling party insufficient balance;
   processing the communication request, wherein the processing comprises steps of:
   monitoring number of call attempts performed by the calling party;
   defining a threshold duration to act as a delay in sending a notification to the called party;
   defining a threshold count for the number of call attempts by the calling party during the threshold duration;
   monitoring availability of the called party; and
   sending the notification to the called party about the call attempt after completion of a threshold duration and upon determining the called party is available; or
   sending the notification to the called party upon determining communication requests exceeds the threshold count during the threshold duration and upon determining the called party is available.

2. The method as claimed in claim 1, wherein monitoring the availability of the called party comprises one of:
   sending a silent message to the called party, wherein the successful delivery of the silent-message prompts the called party to send an acknowledgement indicating the called party availability; and
   analyzing the connectivity between the called party and Mobile Switching Center (MSC) of the called party.

3. The method as claimed in claim 1, wherein notifying the called party about the call attempt comprises:
   sending a message with subscriber information to the called party, wherein the message includes at least one of SMS, MMS, or voicemail message; and
   providing a list of options to perform one or more actions, wherein the list of options is displayed as one of a pop up and a dialog box.

4. The method as claimed in claim 3, wherein the message comprises a call back request and the calling party's telephone number and name, a request that the call recipient contact the caller, and number of call attempts by the calling party.

5. The method as claimed in claim 3, wherein the options comprises at least one of:
   reminding the called party of the notification at a later time;
   informing the calling party when the called party wishes to respond;
   providing status of the called party; and
   disabling further notification from the calling party.

6. The method as claimed in claim 5 further comprising performing one or more actions based on a response of the called party to said list of options.

7. The method as claimed in claim 1 further comprising allowing the called party to receive notifications from a set of predefined numbers in case of an emergency.

8. A computing system implemented within a service layer of a telecommunication-network node for notifying a called party of a call attempt by a calling party, the system comprising:
   a call processing module for receiving and processing a communication request on occurrence of a nonstandard trigger event, the nonstandard trigger event being one of protocol error, internal error and calling party insufficient balance;
   a monitoring module for monitoring number of call attempts performed by the calling party and for monitoring availability of the called party;
   a timer module, in operational interconnection with a counter module, for defining a threshold duration and a threshold count for the number of call attempts by the calling party during the threshold duration;
   and
   a notification module for:
   notifying the called party about the call attempt after completion of the threshold duration and if the called party is available; or
   notifying the called party if the communication requests exceeds the threshold count during the threshold duration and if the called party is available.

9. The system as claimed in claim 8, wherein:
   said monitoring module is configured to determine number of call attempts performed by the calling party and availability of the called party in the network;
   said timer module is configured to calculate time until a threshold time duration, wherein the threshold time duration is a delay time prior to nonstandard trigger notification;
   said counter module is configured to count until a threshold count, wherein the threshold count is number of call attempts made prior to nonstandard trigger notification; and
   said notification module is configured to generate one or more notification messages about a call attempt on detection of the nonstandard trigger event.

10. The system as claimed in claim 9, wherein said one or more notification messages by the notification module comprises:
    message with subscriber information to the called party, wherein the message includes at least one of SMS, MMS, voicemail message; and
    options to perform one or more actions, wherein the options are displayed as one of a pop up and a dialog box to the called party.

11. The system as claimed in claim 8, wherein the system is configured to perform one or more actions based on a response of the called party to said notification messages.

* * * * *